United States Patent [19]
Erlenmayer et al.

[11] 4,127,145
[45] Nov. 28, 1978

[54] MOVABLE PIPELINE ELEMENT

[75] Inventors: Udo Erlenmayer, Eutingen; Reinhard Gropp, Arnbach; Hans Zenn, Pforzheim, all of Germany

[73] Assignee: Metallschlauch-Fabrik Pforzheim (vorm. Hch. Witzenmann) Gesellschaft mit beschrankter Haftung, Germany

[21] Appl. No.: 752,546

[22] Filed: Dec. 20, 1976

[30] Foreign Application Priority Data
Dec. 20, 1975 [DE] Fed. Rep. of Germany ....... 2557713

[51] Int. Cl.² .......................................... F16L 27/02
[52] U.S. Cl. .................................. 137/599; 137/615; 285/151; 285/223; 285/227
[58] Field of Search ................ 137/599, 615; 285/151, 285/152, 223, 226, 227, 228

[56] References Cited
U.S. PATENT DOCUMENTS

| | | | |
|---|---|---|---|
| 268,467 | 12/1882 | Dunlap | 285/151 |
| 701,936 | 6/1902 | Roberts | 285/223 |
| 1,564,485 | 12/1925 | McCandless | 285/151 |
| 3,701,551 | 10/1972 | Morgan | 285/137 R |
| 3,828,451 | 8/1974 | Koning et al. | 285/227 X |

*Primary Examiner*—Robert G. Nilson
*Attorney, Agent, or Firm*—Craig & Antonelli

[57] ABSTRACT

A movable pipeline construction which includes a first pipe and second pipe connected by a movable joint so as to permit angular and/or transverse movements of the pipes with respect to a common longitudinal pipe axis. Each of the pipes are provided with at least one of connecting ports and branch passages which are interconnected by way of flexible pipeline elements. The flexible pipeline elements may be constructed as flexible tubes, hoses, pipe bundles and/or bellows. Preferably, a stop valve construction is arranged in the pipeline elements to control the flow of the medium therethrough without affecting the flow through the other pipeline elements and/or the first and second pipes.

80 Claims, 10 Drawing Figures

MOVABLE PIPELINE ELEMENT

The present invention relates to a pipeline construction and, more particularly, to a movable pipeline construction which includes a feed pipe and a discharge pipe for the medium, each of which is provided with connecting means with the inwardly facing ends of the feed and discharge pipes being connected to each other in a seal-tight manner by way of, for example, connecting flanges or the like and at least one pipeline element at least portions of which are flexible and, if necessary, adjustable in length and with an additional movable joint means for interconnecting the feed and discharge pipes so as to permit the pipes to execute angular movements and/or relative movements directed transversely to an axis of the feed and discharge pipes.

Movable pipeline constructions of this kind, called compensators, usually incorporate one or more bellows in the pipeline system which are formed as corrugated tubes possessing the necessary axial, lateral or angular movability.

In one proposed axial compensator, the bellows formed as corrugated tubes are provided with connecting flanges with the compensator, within certain limits, being capable of executing angular and lateral movements between the connecting flanges so that the proposed compensator absorbs axial, lateral and angular displacements. In this proposed construction, the reaction forces are absorbed by fixed points of the pipes at positions adjoining the bellows since the bellows tend to stretch when subjected to internal pressure loadings.

In a proposed angular compensator bellows construction inserted between a feed pipe and a discharge pipe, the feed and discharge pipes have branches which are mounted on diametrically opposite sides with the feed and discharge pipes being pivotably connected to each other approximately at the longitudinal center of the bellows. In this construction, the bellows exert reaction forces at the longitudinal center so that the bellows are supported by a movable joint.

In a proposed lateral compensator construction provided with bellows, for example, two bellows are arranged between a feed pipe and a discharge pipe with the bellows being connected to each other by means of an additional rigid pipe member. The feed pipe and discharge pipe support axially extending branches which are mounted on diametrically opposite sides to form joints with a rod extending between the joints in the longitudinal center between the two bellows. In this construction, the reaction forces exerted by the bellows are also supported by the movable joints.

In compensators required to provide a long service life under high internal pressure and wide movability and, in some cases, these factors in a pipeline having a large nominal bore cross-section, it has been found that such demands militate against normal design principles which must be observed in developing pipeline compensators.

By virtue of the fact that bellows stretch when subjected to internal pressure, a disadvantage of such construction resides in the fact that there is a potential risk of the bellows breaking laterally and being destroyed when subjected to high internal pressure. Consequently, the bellows must be made increasingly shorter and with thicker walls and must therefor be dimensioned so as to provide for an increased stiffness in order to be able to withstand increasing internal pressure in the pipeline system which occurs by increasing the nominal bore of the pipeline cross-section. However, by shortening the bellows or increasing the wall thickness, the movability of the compensators is greatly impaired since, in order to satisfy the partial requirement for greatly movability, it is necessary for the bellows to be of a substantial length and also of low rigidity or stiffness. Therefore, to retain the desired movability of the compensator, it is often necessary to arrange several pipeline compensators of one or more of the abovementioned types in a series; however, such a solution requires substantial constructional effort, thereby leading to an increase in the costs of the pipeline system.

Furthermore, by virtue of the fact that the movable joints in lateral and angular compensators are subjected to high internal pressure, such joints are highly stressed by the axial thrust resulting from the bellows and must therefor be carefully monitored and maintained in order to prevent premature failure of the bellows.

The utility of the proposed compensators reaches its limits if a specified range of movement must be provided combined with a maximum service life and a large pipeline cross-section for the highest possible internal pressure since bellows of long lengths will create high reaction forces and a required long service life permits only a small movement for each corrugation of the bellows.

The present invention is concerned with the task of avoiding the described disadvantages of proposed compensators and of avoiding a movable pipeline element which permits large movements between pipeline ends and simultaneously withstands high internal pressure while providing a maximum attainable service life and, additionally, providing substantially complete independence of the pipeline cross-section so that pipelines having an above average cross-section no longer present any problems with regard to the functioning of the compensator and, in the event of a defect, such as leakage or the like, at the movable pipeline element, such element nevertheless remains substantially available or useable.

By virtue of the constructional features of the present invention, reaction forces which occur in the axial direction and in the circumferential direction with respect to the axis of the pipe are eliminated or at least compensated unless such reaction forces are useful and desirable in given situations so that it is possible to provide a pipeline element which is movable through six modes of motion, namely, translatory motion in the $x$, $y$ and $z$ directions as well as rotary motion about the axes $x$, $y$ and $z$.

The problem is solved in accordance with the present invention by providing each of the inward-facing ends of the feed pipe and discharge pipe, which may be provided with connecting flanges, with a plurality of connecting branches or ports of which each branch or port associated with one pipe is connected in an identical or comparable seal-tight manner to each of the branches or ports of the other pipe by way of one of the movable pipeline elements which is flexible.

In accordance with the present invention, the cross-section of the feed pipe and discharge pipe is divided into a number of individual pipeline cross-sections defined by the cross-section of the flexible pipeline element so that the dimensions of the flexible pipeline element cross-section can be relatively small. Thus, the individual pipeline elements can be readily dimensioned to an adequate length combined with high stability against internal pressure so that the pipeline element of the present invention offers an extremely high degree of movability between pipe ends and exhibits a very long service life because, as a result of the adequate length of the individual pipeline elements, the individual length portions thereof are only slightly stressed by the movability of the pipeline element. Furthermore, by dividing the main cross-section of the feed pipe and discharge pipe into individual cross-sections defined by flexible pipeline elements results in the cross-section of the pipeline elements being independent of the main pipe cross-section since the number of flexible pipeline elements necessary may be varied in accordance with a larger or smaller main pipe cross-section.

In accordance with the present invention, the connecting ports of each pipe end may be at least partially open in a direction toward the other pipe end, but the connecting ports of each pipe end can be open at least partially or to a remaining part in the direction away from the other pipe. Consequently, a force applied along the axial direction of the pipes by a flexible pipeline element, for example, a bellows, can be controlled as desired, namely, by the force tending to move the pipe ends either away from each other or toward each other or by applying a compensating effect so that the result of the force is equal to zero.

According to one advantageous feature of the present invention, each of the inward-facing ends of the feed and discharge pipes merge into at least two pipe arms or branches which are symmetrically disposed about the central axis of the pipes with the pipe arms of one of the pipes being open substantially parallel to the central axis of the pipe in a direction toward the other pipe. The pipe branches which are substantially parallel with the pipe axis may be situated opposite to each other or adjacent each other and may be connected to each other in seal-tight manner by way of a flexible pipeline element. Preferably, the pipeline elements extend from one connecting end at one of the pipes to the other connecting end through at least one full arc of approximately 360° which is situated substantially in an axial plane of the pipe.

By virtue of the arrangement of the pipe arms and flexible pipeline elements and because of the pressure which prevails in the flexible pipeline elements, the pipeline elements are able to move the pipe branches to which they are connected toward each other, thereby resulting in the feed pipe and the discharge pipe being stressed in a direction toward each other. The reliable performance of the movement of the pipes, even if large forces are involved through the retaining means for the feed and discharge pipes, may be ensured by providing a compression joint between the feed pipe and the discharge pipe or by providing rocker surfaces or the like which bear upon each other and are attached to the free ends of the feed pipe and discharge pipe.

The symmetrical arrangement of the flexible pipeline elements on the circumference of the feed and discharge pipes about the pipe axis in accordance with the present invention also avoids or compensates for any tilting force which may be applied by the pipeline elements between the feed pipe and the discharge pipe.

According to a further advantageous feature of the present invention, if the connecting ports of each pipe end are open in a direction facing away from the other pipe from one of their connections with the feed or discharge pipe, the pipeline elements extend to the other connection through at least one full arc of approximately 360°, thereby producing a resultant axial thrust which tends to move the ends of the feed and discharge pipes away from each other. The resultant axial thrust may be desirable and can be supported through the retaining means for the feed and discharge pipes formed as a bolt joint or the like interposed between the ends of the feed and discharge pipes. A resultant tilting force between the ends of the feed and discharge pipes may be avoided by selecting, in this case, an arrangement which is symmetrical with respect to the pipe axis.

Another advantageous possibility in accordance with the present invention resides in arranging the arcs of the flexible pipe elements so as to pass about an axis which extends transversely to the pipe axis and intersects the same. By such an arrangment, the flexible pipe elements, in an arcuate configuration on both sides of the pipe ends, can then be arranged adjacent to each other in the manner of a battery with associated ports of the pipe ends being made available in simple manner in a distribution box or the like attached to the pipe ends.

According to still a further feature of the present invention, the pipeline elements, in an arcuate configuration, may extend through one or more arcs depending on the desired or required movability of the pipeline element taking into account the prevailing high internal pressure conditions to which the pipeline is to be exposed and also the long service life demands.

According to yet another advantageous feature of the present invention, if the connecting ports of each pipe end are open in a direction facing away from the other pipe and if the flexible pipeline elements extending therefrom describe at least one complete arc, preferably each of the inward-facing ends of the pipe merges into at least two curved pipe branches which are symmetrically arranged on a circumference about the pipe axis and have ends which are open in the direction facing away from the other pipe with the two curved pipe branches extending substantially parallel to the pipe axis. The pipe branches which are arranged opposite or adjacent to each other, substantially parallel with the pipe axis, are connected in a seal-tight manner to each other by means of the flexible pipeline element. By virtue of this construction, the flexible pipeline element tend to move the pipe ends away from each other. However, if the distribution of the flexible pipeline elements about the pipe axis is symmetrical, there will be no resultant tilting moment between the feed pipe and the discharge pipe.

Proceeding from the above-described construction and in conjunction with pipe branches which are disposed symmetrically on a circumference about the pipe axis and are open in the direction towards the other pipe and regarding the connection between said pipe branches through pipeline elements in an arcuate configuration, it is possible that the number of connecting ports or curved pipe branches which are open in the direction facing away from the other pipe is equal to the number of connecting ports of pipe branches which are open in the direction toward the other pipe.

In the event there is no resultant tilting moment between the pipe ends, a compensation or cancelling of the axial thrust will result which tends to move the pipe ends toward each other and away from each other, thereby resulting in a movable pipeline element which is load-relieved as regards tilting moment and axial thrust, a feature which is desirable in many cases. For constructional reasons, it is advantageous if the arc of the pipeline elements extends away from the pipe axis so that the respective arcs are arranged in a star configuration around the pipe axis.

In all of the afore-mentioned arrangements of the present invention, advantageously, the opening direction of the connecting ports or the ports of the pipe branches merge tangentially into the arc defined by the pipeline elements at their connecting ends when the pipeline element is in an initial or normal position. The purpose of this advantageous construction is to prevent the flexible pipeline elements being subjected to any unnecessary buckling force or transverse force in the area of their connecting ends when the movable pipeline elements is in its preferred normal position.

In the last-mentioned construction, the free ends may not always be arranged in alignment with each other by means of a common flexible pipeline element associated with pipe branches which are coordinated with each other. Instead, the pipe branches will be slightly offset in the circumferential direction with respect to the pipe axis, i.e., substantially by the cross-section of the flexible pipeline element including its connecting flanges. Therefore, the flexible pipeline element extends its arc along a shallow helix which results in a circumferential force or torsional moment between the feed pipe and the discharge pipe between the ends of the flexible pipeline elements when this is stressed by internal pressure. In individual cases, such torsional force can be desirable as, for example, for compensation or for counteracting forces which are present in the pipeline system.

If the torsional forces are not desirable, such forces may be eliminated in accordance with the present invention by providing, when the pipeline element is assembled, an even number of pipe branches on each pipe with one-half of the pipe branches of one pipe being offset in the counterclockwise direction about the pipe axis with respect to the other half of the pipe branches. This arrangment results in an equal number of torsional force components in one circumferential direction as well as in the other circumferential direction, whereby the movable pipeline element is free of torsional forces.

Another advantageous manner of avoiding torsional forces in accordance with the present invention is realized if the movable pipe element is arranged so that the pipe ends are in flush alignment with each other parallel to the pipe axis on a plane extending therethrough by means of a common pipeline element of pipe branches which are associated with each other with the ends arranged adjacent to each other radially with respect to the pipe axis on a plane extending therethrough by way of a common pipeline element of pipe branches associated with each other and with an even number of pipe branches arranged on each pipe. The pipe branches of one pipe are arranged about the circumference of the pipe alternately radially outwardly and radially inwardly of the branches of the other pipe and/or all the pipe branches of a pipe are situated outside or within the arms of the other pipe. By this arrangement, torsional forces are no longer possible; however, a radial force component occurs between the pipes at the connecting ends of each flexible pipe element, but such radial force component is compensated by the symmetrical arrangement of the pipe branches.

Advantageously, the movable pipe element can be arranged so that at least one pipe branch of each pipe is combined with at least one curved pipe branch to form a pipe branch with one or more pairs of ends which are open in opposite directions. This arrangement offers the possibility of substantial space savings particularly in situations where it is necessary to provide numerous flexible pipeline elements.

It is also advantageous in accordance with the present invention if the inward-facing pipe ends, which may be provided with connecting flanges, are connected to each other by means of at least one movable joint arranged in an extension between said pipe ends. The joint may be a bolt joint or the like with a pivot axis extending transversely to the pipe axis. However, depending on specific requirements, it is also possible according to the invention to provide a ball joint, the cup of which is arranged on one pipe end and the ball head is arranged at the other pipe end with one of the ball axes coinciding with the pipe axis.

To provide not only angular but also axial movability for the movable pipeline element, according to the present invention, at least one connection member, preferably of variable length in the direction of the pipe axis, is interposed between the movable joint at at least one of the pipe ends.

To provide lateral movability, according to the present invention, the movable pipe element may be arranged so that, if two or more movable joints are arranged serially in the direction of the pipe axis, a connection of variable length in the direction of the pipe axis is provided between each two adjacent movable joints.

To control the amount of angular, axial and lateral movements, according to the present invention, the movable pipe element may be arranged so that the pivotability of the joint or joints and/or the variability of the length of the connection is limited by a stop abutment. These stop abutments may include frame elements connected to the pipe ends which are adapted to act upon each other. However, the stop abutments may also be formed as component parts of the movable joints and/or of the connection members.

Moreover, according to the present invention, the movable pipe element may be constructed so that the free ends of the pipe branches arranged adjacently in the circumferential direction about the pipe axis have contact and/or sliding surfaces which face each other to limit the relative angular movability between pipe ends and also to prevent the pipe branch ends hooking with each other.

The flexible pipeline element of the present invention may be formed as a corrugated metal bellows or hose. However, it is particularly advantageous if the flexible pipeline element is a single-ply or multi-ply hose of metal and/or plastics. Hoses of this nature may be constructed in the form of a corrugated metal wire braiding so as to be rendered seal-tight and stable against high internal pressures and other mechanical stresses. To reduce the flow resistance within the corrugated hose, a smoth-walled plastic hose or a lapped metal hose may also be inserted within the corrugated hose.

However, the flexible pipeline element may also be a pipe or a pipe bundle in which, when subjected to internal pressure loading, the pipes are reinforced with braiding having a braiding angle greater than a neutral braiding angle with the braiding being effected by banding or by pipe portions slid over the pipe element. The pipe portions may advantageously bear upon each other by convex rocker surfaces which extend substantially in the direction of the radius of curvature of the pipe element.

By virtue of the utilization of flexible pipeline elements in the form of pipes or pipe bundles, maximum pressures may be readily controlled although the movable joint action of the movable pipe element is somewhat restricted; however, such restriction is in a tolerable range.

According to yet another advantageous feature of the present invention, each end of the flexible pipeline element is connected through a stop valve to the connecting ports or pipe branches whereby, in the event of a defect in individual flexible pipeline elements, the affected pipeline element may be shut off, removed and replaced by a new pipeline element without having to shut down the entire pipe system containing the movable pipeline element and, instead, the pipe system can be continued practically normally, with a slight restriction, without any down-times when such defects occur on the movable pipeline element.

Accordingly, it is an object of the present invention to provide a movable pipe element which avoids by simple means the drawbacks and shortcomings encountered in the prior art.

A further object of the present invention resides in providing a movable pipeline element which occupies less space and may readily be accommodated in pipe systems having high internal operating pressures.

Yet another object of the present invention resides in providing a movable pipeline element which may be manufactured in a simple manner and which employs, at least in part, commercially available mass produced elements.

A still further object of the present invention resides in providing a movable pipeline element which permits large movements between pipeline ends and also permits movement through six modes of motion.

Another object of the present invention resides in providing a movable pipeline element which ensures a maximum attainable service life of the movable elements.

A further object of the present invention resides in providing a movable pipeline element which minimizes the down-time of a pipe system by permitting selective shut down, removal and replacement of defective flexible pipe elements in the movable pipeline element without shutting down the pipe system.

These and other objects, features and advantages of the present invention will become more apparent from the following description when taken in connection with the accompanying drawings which show, for the purposes of illustration only, several embodiments of a movable pipeline element in accordance with the present invention, and wherein.

Figure 1:
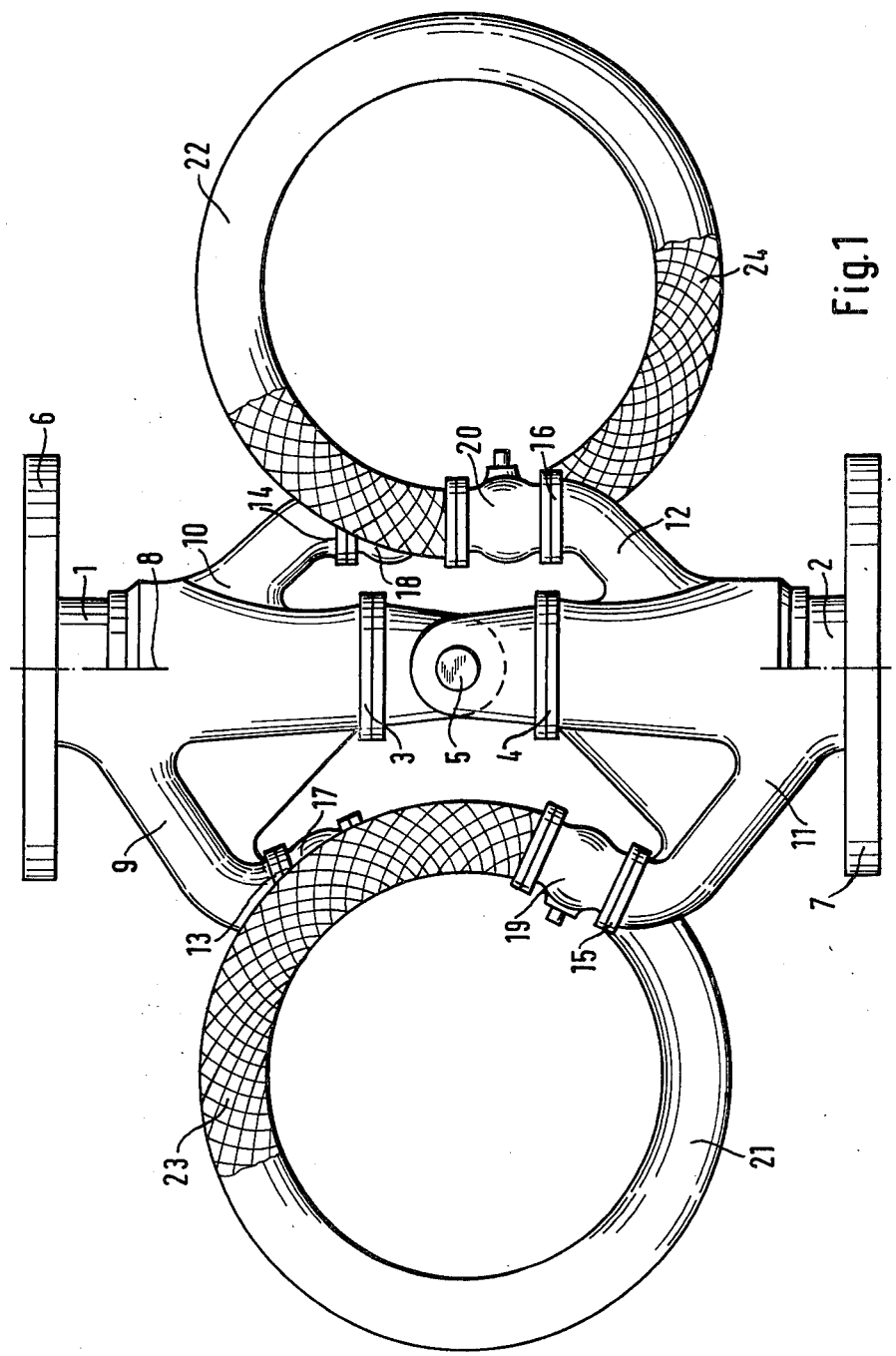
FIG. 1 is a plan view of an angularly movable pipeline construction in accordance with the present invention.

Referring now to the drawings wherein like reference numerals are used throughout the various views to designate like parts and, more particularly, to FIG. 1, according to this figure, a movable pipeline element is arranged within a pipe system which includes pipes 1 and 2 having free ends 3, 4 directed toward each other and closed in a seal-tight manner with respect to the medium carried in the pipe system. For the purposes of explanation, the pipe 1 may be the feed pipe for feeding the medium to be conveyed and the pipe 2 may be the discharge pipe for discharging such medium.

A joint formed, for example, as a joint bolt 5 is provided for pivotally connecting the pipes 1, 2 to each other in a conventional manner whereby the pipes 1, 2 may execute angular motions about the longitudinal axis of the bolt 5. Connecting flanges 6, 7 are provided on the pipes 1, 2 to facilitate the connection within a pipe system of the movable pipeline element.

The pipes 1, 2 are provided with pipe branches 9, 10 and 11, 12 which are approximately diametrically opposed with respect to a central pipe axis 8 with the ends 13, 14 of the branches 9, 10 being open with respect to the ends 15, 16 of the branches 11, 12 substantially in the direction of the pipe axis 8. Flexible pipeline elements, for example, hoses 21, 22 are connected, through stop valves 17, 18, 19, 20, to the pipe branches 9 - 12 and with each of the hoses 21, 22 extending substantially in an axial plane of the pipe axis 8 through a complete arc of at least 360° from one of their respective connecting ends to the other connecting end with the arc extending away from the pipe axis 8.

The hoses 21, 22 may be metal corrugated hoses reinforced with metal braiding 23, 24 with the braiding 23, 24 supporting or protecting the corrugated hoses in a manner not shown in detail, against an interior prevailing pipeline pressure and also protecting the hoses 21, 22 against external mechanical stresses. The interior of the corrugated hoses 21, 22 may be provided, in a known manner, with a lapped metal hose or, for example, with a plastic hose so as to offer the least possible flow resistance to the medium being conducted through the hoses.

As evident from FIG. 1, the pipe branches 9, 10 are arranged behind the pipe branches 11, 12 perpendicularly to the plane of the drawing so that the hoses 21 and 22 extend through their respective arcs in a shallow helix from their connection to the pipe branches 11, 12 perpendicularly to the plane of the drawing rearwardly to the connection point with the pipe branches 9, 10.

By the provision of the hoses 21, 22, the flow cross-section defined by the pipes 1, 2 is subdivided into the flow cross-sections defined by the cross-sections of the hoses 21 and 22. While only two hoses 21, 22 are shown in FIG. 1, a further pair of branches may be provided and arranged perpendicularly to the plane of the drawing with it merely being essential that the additional branches be disposed symmetrically over the circumference of the pipes 1, 2 about the axis 8. The subdividing of the flow cross-sections of the pipes 1, 2 results in smaller flow cross-sections for the flexible hoses 21, 22 so that control of the high internal pressure may be substantally improved and such control is more reliable than if the pipes 1, 2 were to be connected directly by way of a flexible pipeline element having the same cross-section as the cross-section of the pipes 1, 2.

Moreover, the subdivision of the flow cross-section also results in movable pipeline elements being independent of the flow cross-section of the pipes 1, 2 because any increase in flow cross-section of the pipes 1, 2 merely necessitates an increase in the number of flexible pipeline elements or hoses 21, 22 in a symmetrical manner so that the flow cross-section of the hoses 21, 22 can remain unchanged.

Furthermore, by extending the hoses 21, 22 over a complete arc, such extension causes the hoses to tend to move into a stretched position when subjected to internal pressure so that the hose 21 tends to move the pipe branches 9 and 11 toward each other and the hose 22 tends to move the pipe branches 10 and 12 toward each other when subjected to internal pressure. This movement results in the generation of a force causing the pipes 1, 2 to be thrust against each other; however, the symmetrical arrangement of the hoses 21, 22 prevents the occurrence of a resultant tilting force between the pipes 1, 2. Therefore, the joint bolt 5 is stressed in compression in the direction of the pipe axis 8.

The fact that the hoses 21 and 22 extend in a shallow helix has the effect, in the circumferential direction, with respect to the pipe axis 8 of tending to move the free ends of the hoses 21, 22 into a common axial plane of the pipe axis 8. In other words, the respective ends of the hose 21 are urged or thrust against their associated ends of the branches 9, 11 in the circumferential direction with respect to the pipe axis 8 while the respective ends of the hose 22 are urged or thrust against their associated ends of the branches 10, 12 in the circumferential direction with respect to the pipe axis 8. Assuming the pipe 1 is stationary, branch 11 as well as the branch 12 are urged or thrust to the rear, as viewed perpendicular to the plane of the drawing. Since the two forces which act on the pipe branches 11, 12 in the circumferential direction with respect to the pipe axis 8 are directed opposite to each other, such forces cancel each other so that the pipeline element is free of torsional forces with respect to the pipe axis 8.

With regard to the relative position of the pipes 1, 2, the hoses 21, 22 or other flexible pipe elements in their entirety need not perform any supporting functions so that load-bearing capacity of the hoses 21, 22 is fully available for guiding the flow of the medium therethrough.

Moreover, the movable pipeline element of FIG. 1 clearly provides a very wide angular movability between pipes 1 and 2 about the axis of the bolt 5 so that the pipeline element compensates large offset motions between connecting pipelines without any hazards or difficulties.

By the provision of the stop valves 17-20, it is possible to permit an appropriate flexible pipeline element such as, for example, hoses 21 or 22 to be shut down and/or exchanged in the event of a defect without impairing the operation of the other existing flexible pipeline elements and/or the entire movable pipeline element. Consequently, a defective flexible pipeline element may be exchanged without shutting down the entire pipeline system.

Figure 2:
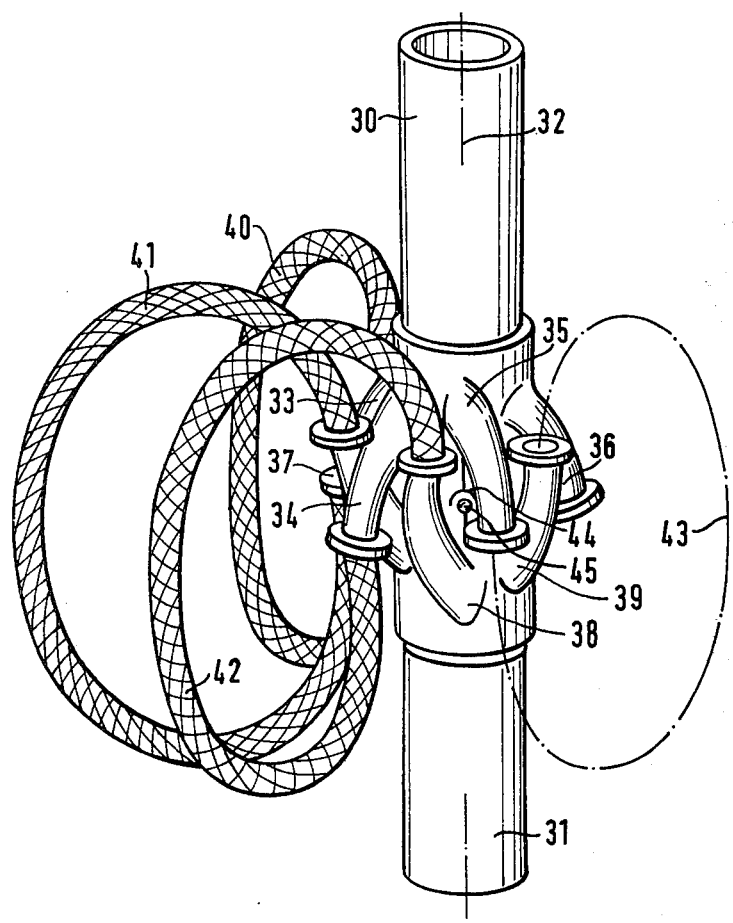
FIG. 2 is a perspective view of another embodiment of an angularly movable pipeline construction in accordance with the present invention.

As shown in FIG. 2, a movable pipeline element is provided for a pipe system which includes pipes 30, 31 having a common pipe axis 32 with a plurality of pipe branches 33-36 and 37-39, of which some are only partially visible in the figure, arranged about the circumference of the pipes 30, 31. The pipe branches 33-36 and 37-39 interlace with each other alternately, as viewed in the direction of the axis 32, and are connected to each other by means of flexible pipeline elements, for example, hoses 40-43.

The movable pipeline element of FIG. 2 functions in the same manner as described hereinabove subject to the following differences:

In the movable pipeline element of FIG. 2, the pipes 30 and 31 are axially supported against each other by way of a schematically illustrated ball joint having a cup 44 connected to the pipe 30 and a ball 45 seated at the pipe 31, whereby the pipes 30, 31 are angularly movable in any direction.

Furthermore, the pitch of the helix of all hoses 40-43 extends in the same circumferential direction so that the movable pipeline element of FIG. 2 is not free of torsional forces. Assuming the pipe 30 is stationary, the pipe 31 would be rotated to the left with respect to the drawing until the pipe branch 38 abuts the branch pipe 34. By virtue of the construction of FIG. 2, the movable pipeline element is intrinsically suitable for situations in which torsional forces are to be absorbed through pipes 30, 31.

Figure 3:
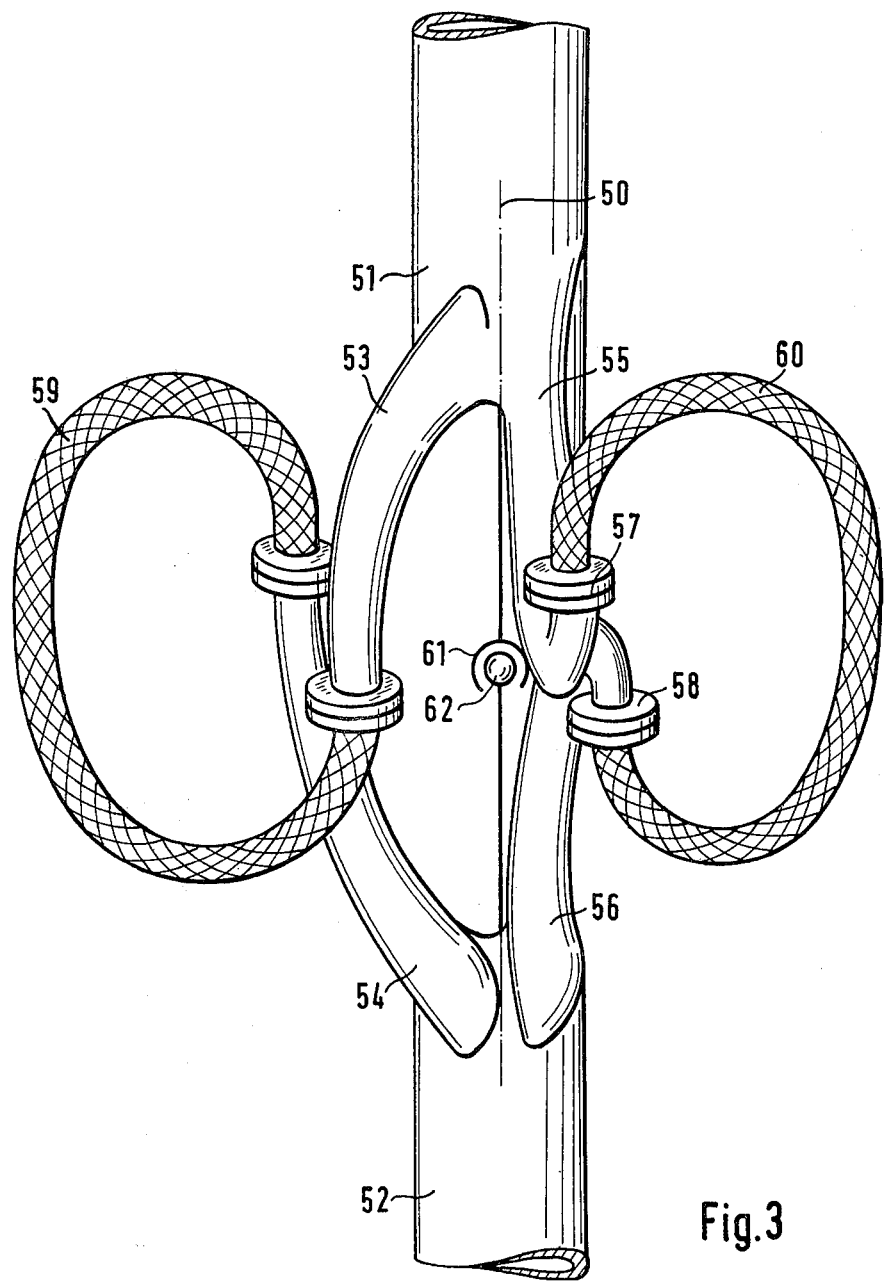
FIG. 3 is a partial perspective view of a further embodiment of a movable pipeline element according to the present invention.

The movable pipeline element of FIG. 3 provides a construction which is completely load-relieved not only in the direction of the pipe axis 50, but also in the circumferential direction with respect to the axis 50. For this purpose, open and nearly straight pipe branches 53, 54 extend from the pipes 51, 52, respectively, in a direction substantially parallel to the axis 50 with the respective ends of the pipes 51, 52 facing one another. Pipe branches 55, 56 extend from the pipes 51, 52, respectively, and are offset approximately 90° in the circumferential direction with respect to the axis 50 with the ends 57, 58 of branches 55, 56 being curved back through 180° and opening axially in the direction toward the respective pipe from which they extend. Flexible pipeline elements, for example, hoses 59, 60 are interposed between the branch pipes 53, 54 and 55, 56, respectively.

By virtue of this arrangement, hose 59 tends to move the pipes 51, 52 toward each other in the same manner described in connection with FIG. 1. However, the hose 60 tends to pull the pipes 51, 52 away from each other due tp the tendency of the hose 60 to stretch into a straight line when subject to internal pressures.

It is possible, in a manner not shown in FIG. 3 for the sake of clarity, to provide a further pair of pipe branches 53, 54 at the pipes 51, 52 as well as a further pair of pipe branches 55, 56 at the pipes 51, 52 at diametrically opposite positions on the pipes, whereby oppositely directed forces exerted by the hoses 59, 60 as described above cancel each other so that a movable pipeline element results which is free of axial and tilting forces.

As shown in FIG. 3, the helix defined by the hoses 59 and 60 in the circumferential direction about the axis 50 extends in opposite directions so that the hose 59 tends to move the pipe branches 53, 54 toward each other and the hose 60 tends to move the ends 57, 58 of the pipe branches 55, 56 toward each other. Since these forces applied in the circumferential direction with respect to the axis 50 are directed opposite each other, an equalization of forces results, thereby providing a construction which is free from reaction forces.

The pipes 51, 52 bear upon each other or are positively connected to each other by way of a schematically illustrated ball joint having a cup 61 connected to the pipe 51 and a ball 62 seated at the pipe 52. Consequently, the movable pipeline element of FIG. 3 is pivotable in all directions without the ball joint having to absorb reaction forces so that the ball joint is practically free of maintenance requirements because such joint is unstressed.

Depending upon the cross-section of the pipes 51 and 52, any multiple opposed pipe branches 53, 54 and 55, 56 may be provided with suitable flexible pipe elements such as, for example, hoses 59, 60 connecting the associated pairs of pipe branches.

Another manner of compensating torsional force about the axis 50 can be effected by extending the pipe branches 53, 54 with their free ends being curved with an offset against each other in the circumferential direction so that their openings of the pipe branches 53, 54 are in flush alignment with each other parallel with the axis 50 or are situated adjacent to each other radially with respect to the axis 50. The same orientation may be effected with respect to the pipe branches 55, 56. The flexible pipeline element, for example, hoses 59, 60, will then describe an arc in a plane such that the ends of the hoses no longer apply a force component in the circumferential direction about the axis 50.

Specifically, if the ends of the pipe branches 53, 54 and 55, 56 are in alignment with each other, no force component occurs radially with respect to the axis 50. However, if the ends are radially adjacent to the axis 50, compensation of the radial forces exerted by the hoses 59, 60 may be obtained by arranging for symmetrically alternating radial offset over the circumference of the branch ends of the pipes 51, 52.

Figure 4:
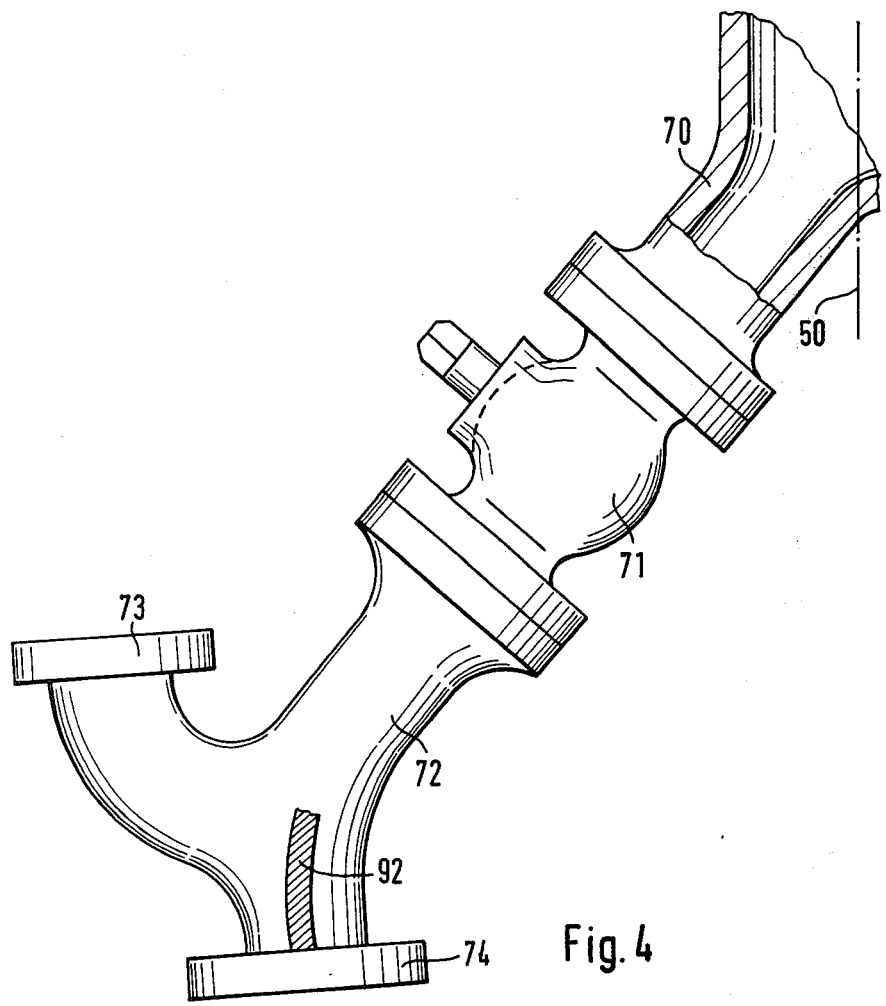
FIG. 4 is a partial cross-sectional view of a double pipe branch in accordance with the present invention.

FIG. 4 provides an example of a pipe branch construction which is advantageous in situations wherein a relatively large number of pipeline connections must be accommodated about the axis 50 or in situations wherein a simplification of the construction of the movable pipeline element of FIG. 3 is desired. Specifically, an end member 72 provides two branched passages 73, 74 with each opening parallel to the axis 50, but in opposite directions. The end member 72 is connected to a pipe branch 70 through a stop valve 71. The pipe branch 70 may extend from the pipe 51 (FIG. 3) whereby it is possible to combine the pipe branches 53, 55 into a single component. Consequently, to simplify the construction of FIG. 3, it would merely be necessary to provide a branch 70 extending from the pipe 51 and provide an end member 72, thereby dispensing with the need of two pipe branches 53 and 55 at the pipe 51. To accommodate a relatively large number of pipeline connections, several branch pipes 70 may extend from the pipe 51 with each being provided with end member 72, whereby each branch pipe 70 could then accommodate two flexible pipeline elements providing a wider range of applications for the movable pipe element construction of the invention. In this case and also in case of FIG. 5 the branched passages 74 (FIG. 4) or 84, 86; 84', 86; 84, 86' (FIG. 5) arranged adjacently in the circumferential direction about the pipe axis have contact and/or sliding surfaces 92 which face each other to limit the relative angular movability between pipe ends and also to prevent the branched passages hooking with each other.

Figure 5:
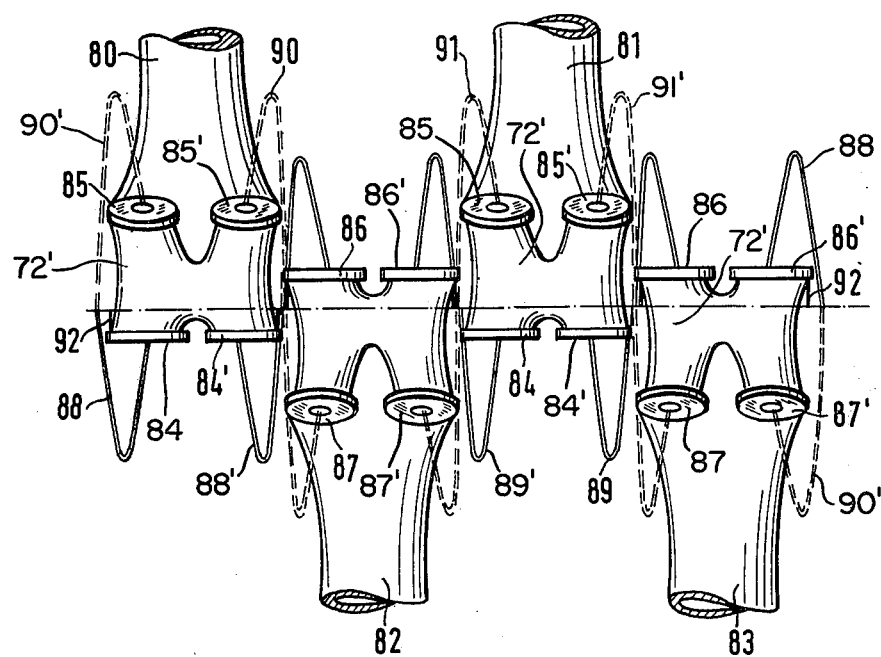
FIG. 5 is a circumferential development of a pipeline element in accordance with the present invention illustrating several pipe branches combined into a common pipe branch.

In the double branch construction of FIG. 5, a pipe as, for example, pipe 51 (FIG. 3) is provided with two pipe branches 80, 81 extending therefrom at diametrically opposed positions and the pipe as, for example, pipe 52 (FIG. 3) is provided with two pipe branches 82, 83 extending therefrom at diametrically opposed positions at an offset of 90° with respect to the pipe branches 80, 81.

Each of the two pipe branches 80, 81 is connected, through a stop valve (not shown) to an end member 72' which is fashioned as the end member 72 (FIG. 4), but which includes two pairs of branch passages 84, 84' and 85, 85', each pair of which, i.e., 84, 85 and 84', 85' correspond to the branch passages 74, 73 of the end member 72.

Each of the two pipe branches 82, 83 is connected, through a stop valve (not shown), to an end member 72" which is fashioned as an end member 72 (FIG. 4), but which includes two pairs of branch passages 86, 86' and 87, 87', each pair of which corresponds to the branch passages 73, 74 of the end member 72.

Schematically illustrated flexible pipeline elements 88, 88', 89, 89' extend with an opposite helical pitch from their appropriate branch passages 84, 84' of the pipe branches 80 and 81 to their associated branch passages 86, 86' of the pipe branches 82 and 83. The flexible pipeline elements 88, 88', 89, 89' may be fashioned as, for example, hoses such as the hose 59 of FIG. 3.

Further schematically illustrated flexible pipeline elements 90, 90', 91, 91' extend with an opposite helical pitch from their appropriate branch passages 85, 85' of the pipe branches 80 and 81 to their associated branch passages 87, 87' of the pipe branches 82 and 83. The flexible pipeline elements 90, 90', 91, 91' may be fashioned as, for example, hoses such as the hose 60 of FIG. 3.

As can be seen from FIG. 5, the number of flexible pipeline elements 88, 88', 89, 89' on the one hand and 90, 90', 91, 91', on the other hand, is identical so that full compensation is provided with respect to the axial thrust exerted by the flexible pipeline elements. This is also applicable with respect to the torsional direction since half of the flexible pipeline elements of the construction of FIG. 5 have a helical pitch which is opposite to the helical pitch of the other half in terms of the circumferential direction.

Figure 6:
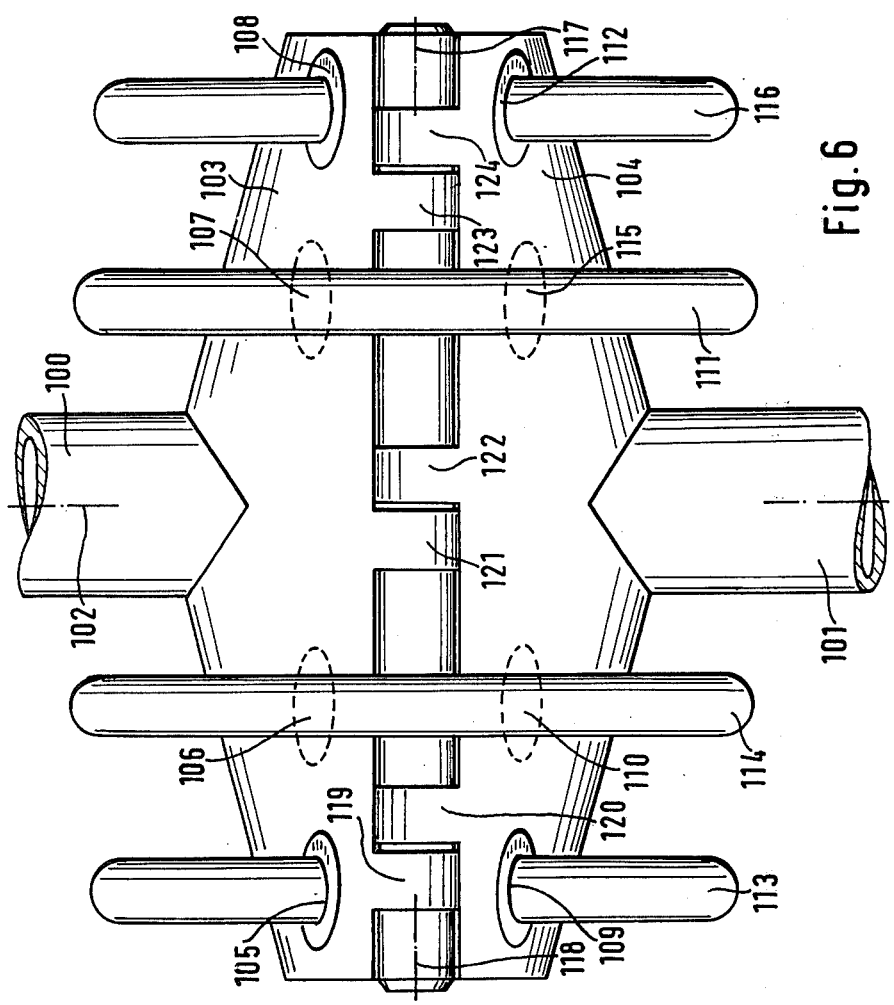
FIG. 6 is a plan view of another embodiment of an angularly movable pipeline element in accordance with the present invention.

FIG. 6 provides an example of a movable pipeline element wherein pipes, for example, feed and discharge pipes 100, 101 having a common pipe axis 102 merge into distribution boxes 103, 104 provided with connecting ports 105–112 which are open in a direction facing away from the other pipe. The ports 105–112 are connected to each other by way of pipeline elements 113–116 which extend through a full arc between their associated ports 105–112. The arc of the pipeline elements 113–116 extends about a common axis 117 disposed transversely to and intersecting with the pipe axis 102. Therefore, the pipeline elements 113–116 are arranged adjacently and symmetrically on both sides of the pipe axis 102 in the manner of a battery.

The connecting ports 105–112 for the pipeline elements 113–116 are situated alternately on the side of the distribution boxes 103, 104 which faces the observer and the side which faces away from the observer so that with the symmetrical arrangement of the pipeline elements 113-116, the tilting forces applied by the pipeline elements above and below the axis 117 to the distribution boxes 103, 104 and to the pipes 100, 101 are cancelled. As with the above-described embodiments, the pipeline elements may be formed as flexible elements such as, for example, hoses or the like and stop valves (not shown) may be provided at the connecting points 105-112 to facilitate interchanging of a defective pipeline element without shutting down the entire system.

A joint, movable about the axis 117, is formed between the pipes 100 and 101 by the coaxial provision of a pivoting bolt 118 which is surrounded by the distribution boxes 103, 104 through bearing eyes 119-124 arranged on the distribution boxes in the manner of a comb.

Figure 7:
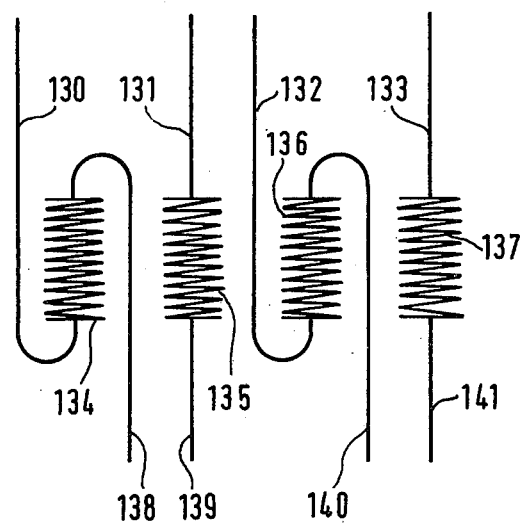
FIG. 7 is a schematic circumferential development of another embodiment of a movable pipeline element in accordance with the present invention.

FIG. 7 is a schematic view of a further embodiment of a movable pipeline element developed about the circumference of a pipe axis wherein pipe branches 130-133 extend from a feed pipe such as, for example, the feed pipes described in connection with above embodiments with the branches 130-133 being connected through expansible elements, for example, metal bellows 134-137 to pipe branches 138-141 which extend from a discharge pipe of, for example, the types described hereinabove. The pipe branches 131, 133 are open in a direction toward, for example, the discharge pipe while the pipe branches 130, 132 are open in a direction which faces away from the discharge pipe, that is, the ends of the branches 130, 138 and 132, 140 face each other with the bellows 134, 136 being interposed between the respective ends.

As shown in the developed view of FIG. 7, the bellows 135, 137 and the bellows 134, 136 are arranged at diametrically opposite positions with respect to each other and are offset through 90° with respect to each other about the pipe axis in relation to the groups of two.

As already described with respect to the construction of FIG. 3, this arrangement of the bellows and branch pipes has the effect that the axial thrust exerted by the bellows 135, 137 tends to move the feed and discharge pipe ends away from each other while an axial thrust of the same magnitude exerted by the bellows 134, 136 tends to move the feed and discharge pipe ends toward each other so that equilibrium or compensation is obtained in terms of the total axial thrust applied to the pipe ends. Since the bellows are arranged symmetrically about the pipe axis, there will be not tilting moment applied to the ends of the feed and discharge pipes.

Figure 8:
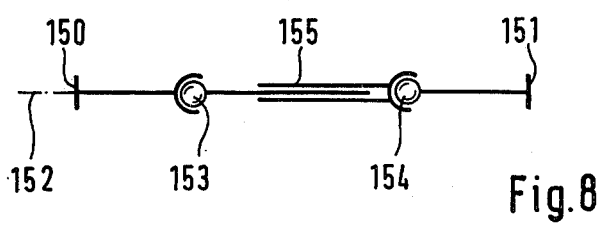
FIG. 8 is a schematic view of an axially, laterally and angularly movable joint for joining two pipe ends in accordance with the present invention.

FIG. 8 provides a schematic view of a joint connection between ends of feed and discharge pipes which permits movement between the pipe ends in all six modes, i.e., translatory motion in the x, y, z directions as well as rotary motion about the axes x, y, z. In the figure, pipe ends 150, 151 which may correspond, for example, to the pipe ends 3, 4 of FIG. 1, are disposed opposite each other and extend along a common pipe axis 152. Each of the pipe ends 150, 151 is provided with a ball joint 153, 154 with the pipe ends being coupled to each other through the ball joints 153, 154 and by a connection member 155 of variable length which can be fashioned so as to form a telescopically slidable connection. Preferably, the center of the ball of the ball joint intersects at a point along the pipe axis.

By virtue of the pipe end connections of FIG. 8, the pipe ends 150 and 151 can execute any mutual tilting, pivoting and axial movement. Moreover, by constructing the joints 153, 154, on the one hand, and the connection member 55 of variable length, on the other hand, in a conventional manner, it is possible to ensure that the relative motions of the pipe ends 150 and 151 are limited, namely, by limiting the movability of the joints 153, 154, on the one hand, and of the connection member 155, on the other hand, by providing stop abutments or shoulders in a manner not shown in detail in the drawings.

As readily apparent, a plurality of ball joints 153, 154 and extension or connection members 155 may be arranged in series with a ball joint being arranged between one pipe end and a first connection member (not shown) and a further ball joint arranged between the other pipe end and a second connection member (not shown). A further ball joint (not shown) would then be interposed between the first and second connection members. Depending upon the particular application, further connection members (not shown) could be interposed between the first and second connection members with ball joints being interposed between adjacent ends of the further connection members.

Figure 9:
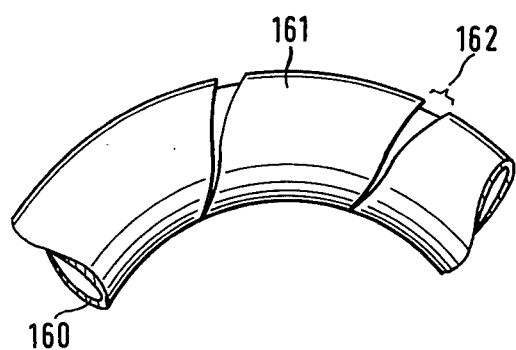
FIGS. 9 and 10 are partial perspective views of flexible pipeline elements in accordance with the present invention having different reinforcements for withstanding extreme internal or external pressure loadings.
Figure 10:
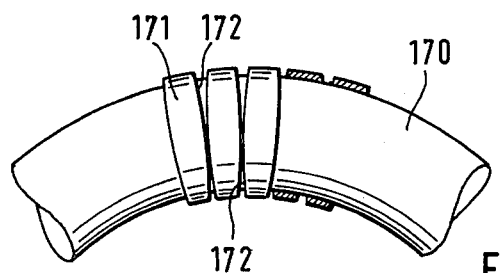

Rather than constructing the flexible pipe elements as, for example, the hoses 21, 22 (FIG. 1), 40-43 (FIG. 2) or 59, 60 (FIG. 3), the flexible pipeline elements may be formed as pipes 160, 170 of pipe bundles when it is necessary to overcome maximum internal pressures in the manner shown most clearly in FIGS. 9 and 10.

According to the construction of FIG. 9, the pipe 160 is surrounded by banding 161 which assists in supporting or withstanding the very high internal pressure within the pipe 160. The banding 161 may comprise a plurality of plies with at least two plies being lapped in alternating opposite directions and applied to the pipe 160 which the pipe is in a stretched condition. The completed pipe 160 is subsequently curved into the arcuate shape according to, for example, FIG. 1, whereby at the joints of the individual plies of the banding, a gap 162 will occur at an outer ply and the radially outwardly disposed fibers of the pipe 160 will be elongated. This construction of the pipe 160 ensures adequate movability of the flexible pipeline element with the least possible bending resistance.

According to FIG. 10, flexible pipeline elements are provided which include a pipe 170 having surmounted pipe portions 171 for reinforcing the pipe 170 against extremely high internal pressures. The pipe portions 171 have, along the longitudinal axis of the pipe 170, convex rocker surfaces 172 which extend substantially radially with respect to the curvature of the pipe 170 to provide mutual support in the longitudinal direction of the pipe 170. The rocker surfaces provide the pipe 170 with adequate freedom for bending with a relatively low bending resistance.

While we have shown and described several embodiments in accordance with the present invention, it is understood that the same is not limited thereto, but is susceptible of numerous changes and modifications as known to those skilled in the art, and we therefor do not wish to be limited to the details shown and described herein, but intend to cover all such changes and modifications as are encompassed by the scope of the appended claims.

We claim:

1. A movable pipeline construction comprising:
   a first pipe means for conveying a pressure medium therethrough;

a second pipe means for conveying a pressure medium therethrough;

pivotable joint means for sealingly connecting adjacent ends of said pipe means to each other;

at least two port means each provided on said first pipe means for directing at least a portion of a flow of a medium from said first pipe means;

at least two flexible pipeline means each connected respectively to said at least two port means for receiving the flow of the medium from said port means of said first pipe means;

at least two port means each provided on said second pipe means and each connected respectively with said at least two flexible pipeline means for diverting the flow from said pipeline means into said second pipe means, wherein said at least two flexible pipeline means extend respectively from said at least two port means on said first pipe means to said at least two port means on said second pipe means through an arcuate path of a predetermined arc length of substantially 360°.

2. A construction according to claim 1, wherein said pivotable joint means includes a joint element interposed between the adjacent ends of said pipe means to permit at least one of angular and transverse movement relative to a common longitudinal axis of said first and second pipe means.

3. A construction according to claim 2, wherein said pivotable joint means further includes flange means provided on adjacent ends of said first and second pipe means, and wherein said joint means is interposed between and connected with the flange means of said first and second pipe means.

4. A construction according to claim 3, wherein each of said first and second pipe means includes a plurality of port means spaced about the circumference of the respective pipe means, and wherein at least two pipeline means are arranged between at least two port means of said first pipe means and at least two associated port means of said second pipe means.

5. A construction according to claim 4, wherein the port means of each of said first and second pipe means are at least partly open in a direction toward the other pipe means.

6. A movable pipeline construction comprising:

a first pipe means for conveying a pressure medium therethrough;

a second pipe means for conveying a pressure medium therethrough;

joint means for sealingly connecting adjacent ends of said pipe means to each other;

at least one port means provided on said first pipe means for directing at least a portion of a flow of a medium from said first pipe means;

at least one pipeline means connected to said at least one port means for receiving the flow of the medium from said port means of said first pipe means; and at least one port means provided on said second pipe means connected with said at least one pipeline means for diverting the flow from said pipeline means into said second pipe means, wherein said joint means includes a joint element interposed between the adjacent ends of said pipe means to permit at least one of angular and transverse movement relative to a common longitudinal axis of said first and second pipe means.

wherein said joint means further includes flange means provided on adjacent ends of said first and second pipe means, and wherein said joint means is interposed between and connected with the flange means of said first and second pipe means, wherein each of said first and second pipe means includes a plurality of port means spaced about the circumference of the respective pipe means, and wherein at least one pipeline means is arranged between one of the port means of said first pipe means and an associated port means of said second pipe means, wherein the port means of each of said first and second pipe means are at least partly open in a direction toward the other pipe means, and wherein the port means of each of said first and second pipe means are at least partly open in a direction facing away from the other pipe means.

7. A construction according to claim 6, wherein said at least one pipeline means is a flexible element.

8. A movable pipeline construction comprising:

a first pipe means for conveying a pressure medium therethrough;

a second pipe means for conveying a pressure medium therethrough;

joint means for sealingly connecting adjacent ends of said pipe means to each other;

at least one port means provided on said first pipe means for directing at least a portion of a flow of a medium from said first pipe means;

at least one pipeline means connected to said at least one port means for receiving the flow of the medium from said port means of said first pipe means; and at least one port means provided on said second pipe means connected with said at least one pipeline means for diverting the flow from said pipeline means into said second pipe means, wherein said port means of said first and second pipe means each include at least two branch passage means which are symmetrically disposed on the respective pipe means with respect to a common longitudinal axis of said pipe means, each of said branch passage means of said first and said second pipe means having opening means arranged in a direction substantially parallel to the common longitudinal axis of the pipe means with the opening means of the branch passage means of the first pipe means facing the opening means of the branch passage means of said second pipe means and being arranged on the respective pipe means such that when said first and second pipe means are connected by said joint means, the opening means of the at least two branch passage means of said first pipe means and the opening means of the at least two branch passage means of said second pipe means are in one of an opposed relation and offset relation with respect to each other, and wherein at least one pipeline means is interposed between the opening means of the branch passage means of the first pipe means and an associated opening means of the branch passage means of the second pipe means, each of said pipeline means extending between the respective opening means of the branch passage means along an arcuate path of a predetermined arc length.

9. A construction according to claim 8, wherein the predetermined arc length of the arcuate path of each of the pipeline means is at least 360°.

10. A construction according to claim 8, wherein the arcuate path of each of the pipeline means is arranged substantially in an axial plane of said pipe means.

11. A construction according to claim 10, wherein each of said pipeline means is a flexible pipe element.

12. A construction according to claim 11, wherein each of the branch passage means of said first pipe means and said second pipe means includes passages extending substantially parallel to the pipe axis.

13. A construction according to claim 12, wherein the opening means of the branch passage means merge tangentially into the arcuate path of the respective pipeline means at least when the pipeline means is in a normal position.

14. A construction according to claim 12, wherein said joint means includes an extension means interposed between the adjacent ends of said pipe means for permitting relative movement between the pipe ends.

15. A construction according to claim 14, wherein said joint means further includes at least one ball joint means comprising a ball element and ball receiving means interposed between an end of said extension means and one of the ends of said pipe means, and wherein the ball element is arranged so that a center thereof is disposed along the common longitudinal axis of the pipe means.

16. A construction according to claim 15, wherein said extension means is variable in length along the common longitudinal axis of the pipe means.

17. A construction according to claim 16, wherein at least two ball joint means are provided, one of said ball joint means being interposed between a first end of said extension means and an end of one of said pipe means and the other of said ball joint means being interposed between a second end of said extension means and an end of the other of said pipe means.

18. A construction according to claim 17, wherein stop means are provided for limiting at least one of a pivotal movement of said ball joint means and a length variation of said extension means.

19. A construction according to claim 18, wherein said stop means are formed as a component element of at least one of said ball joint means and said extension means.

20. A construction according to claim 15, wherein a plurality of ball joint means and a plurality of extension means are interposed in series between the ends of said pipe means with one ball joint means being arranged between each pipe end and one extension means and a ball joint means arranged between adjacent extension means.

21. A construction according to claim 20, wherein stop means are provided for limiting at least one of a pivotal movement of said ball joint means and a length variation of said extension means.

22. A construction according to claim 21, wherein said stop means are formed as a component element of at least one of said ball joint means and said extension means.

23. A construction according to claim 12, wherein said flexible pipe element is constructed as a flexible hose.

24. A construction according to claim 23, wherein said flexible hose is a single-ply hose.

25. A construction according to claim 24, wherein said single-ply hose is constructed of at least one of metal and plastic.

26. A construction according to claim 23, wherein braiding means is provided for reinforcing said hose to permit the same to withstand high internal pressures.

27. A construction according to claim 26, wherein said braiding means includes a band disposed about the circumference of said hose at a braiding angle greater than a neutral braiding angle.

28. A construction according to claim 26, wherein said braiding means includes a plurality of pipe sections disposed about the circumference of the hose at least along a substantial portion of a length of said hose.

29. A construction according to claim 28, wherein each of said pipe portions includes convex rocker surfaces which bear upon each other and extend substantially in a direction of a radius of curvature of the hose.

30. A construction according to claim 23, wherein said flexible hose is a multi-ply hose.

31. A construction according to claim 30, wherein said multi-ply hose is constructed of at least one of metal and plastic.

32. A construction according to claim 31, wherein braiding means is provided for reinforcing said hose to permit the same to withstand high internal pressures.

33. A construction according to claim 32, wherein said braiding means includes a band disposed about the circumference of said hose at a braiding angle greater than a neutral braiding angle.

34. A construction according to claim 32, wherein said braiding means includes a plurality of pipe sections disposed about the circumference of the hose at least along a substantial portion of a length of said hose.

35. A construction according to claim 34, wherein each of said pipe sections includes convex rocker surfaces which bear upon each other and extend substantially in a direction of a radius of curvature of the hose.

36. A construction according to claim 12, wherein said flexible pipeline element is a flexible tube.

37. A construction according to claim 36, wherein braiding means is provided for reinforcing said flexible tube to permit the same to withstand high internal pressures.

38. A construction according to claim 12, wherein said flexible pipeline element includes a bundle of flexible pipes.

39. A construction according to claim 38, wherein braiding means is provided for reinforcing each of said flexible pipes in the bundle to permit the pipes to withstand high internal pressures.

40. A construction according to claim 12, wherein stop valve means are arranged in each flexible pipe element for controlling the flow of the medium through the respective flexible pipe elements such that upon a closing of the stop valve means, a flexible pipe element may be removed from between the associated opening means of the branch passage means without affecting the flow of the medium through the pipe means and the remaining flexible pipe elements.

41. A construction according to claim 1, wherein said arcuate path passes around an axis which extends transversely to a common longitudinal axis of said pipe means.

42. A construction according to claim 1, wherein said pivotable joint means is a bolt joint having a pivot axis arranged transversely to a common longitudinal axis of said first and second pipe means.

43. A construction according to claim 1, wherein said pivotable joint means includes a medium distribution box means provided on adjacent ends of said pipe means, and wherein said port means of said first and second pipe means are provided in said distribution box means, and wherein a pivot bolt means is provided for connecting said distribution box means to each other.

44. A construction according to claim 43, wherein a plurality of port means are provided in said distribution box means, said port means being arranged symmetrically with respect to a common longitudinal axis of said first and second pipe means, and wherein at least two pipeline means are arranged between the port means of the distribution box means of said first pipe means and the port means of the distribution box means of said second pipe means.

45. A construction according to claim 44, wherein each of said flexible pipeline means is a flexible pipe element.

46. A construction according to claim 45, wherein said flexible pipe element is a hose.

47. A construction according to claim 46, wherein said hose is constructed of at least one of metal and plastic.

48. A construction according to claim 45, wherein said flexible pipe element is a flexible tube.

49. A construction according to claim 45, wherein said flexible pipe element includes a bundle of flexible pipes.

50. A construction according to claim 45, wherein said pivot bolt means has a pivot axis extending transversely of a common longitudinal axis of said first and second pipe means.

51. A movable pipeline construction comprising:
- a first pipe means for conveying a pressure medium therethrough;
- a second pipe means for conveying a pressure medium therethrough;
- joint means for sealingly connecting adjacent ends of said pipe means to each other;
- at least one port means provided on said first pipe means for directing at least a portion of a flow of a medium from said first pipe means;
- at least one pipeline means connected to said at least one port means for receiving the flow of the medium from said port means of said first pipe means; and
- at least one port means provided on said second pipe means connected with said at least one pipeline means for diverting the flow from said pipeline means into said second pipe means,
- wherein said at least one pipeline means extends from said at least one port means on said first pipe means to said at least one port means on said second pipe means through an arcuate path of a predetermined arc length, and
- wherein the predetermined arc length of the arcuate path is at least 360°.

52. A movable pipeline construction comprising:
- a first pipe means for conveying a pressure medium therethrough;
- a second pipe means for conveying a pressure medium therethrough;
- joint means for sealingly connecting adjacent ends of said pipe means to each other;
- at least one port means provided on said first pipe means for directing at least a portion of a flow of a medium from said first pipe means;
- at least one pipeline means connected to said at least one port means for receiving the flow of the medium from said port means of said first pipe means; and
- at least one port means provided on said second pipe means connected with said at least one pipeline means for diverting the flow from said pipeline means into said second pipe means,
- wherein said at least one pipeline means extends from said at least one port means on said first pipe means to said at least one port means on said second pipe means through an arcuate path of a predetermined arc length,
- wherein said arcuate path passes around an axis which extends transversely to a common longitudinal axis of said pipe means, and
- wherein said port means of said first and second pipe means each include at least two curved branch passage means arranged symmetrically about the circumference of the respective pipe means, each of said curved branch passage means including opening means arranged in a direction substantially parallel to the common longitudinal axis of the pipe means with the opening means being arranged on the respective pipe means such that when said first and second pipe means are connected by said connecting means, the opening means of the curved branch passage means of the respective pipe means are in one of an opposed relation and offset relation with respect to each other, wherein an opening means of one of two curved branch passage means of said first pipe means faces away from an associated opening means of one of the two curved branch passage means of said second pipe means and an opening means of the other of the two curved branch passage means of said first pipe means faces an associated opening means of the other of the two curved branch passage means of said second pipe means, and wherein at least one pipeline means is interposed between the respective opening means of the curved branch passage means of the first pipe means and an associated opening means of the curved branch passage means of the second pipe means.

53. A construction according to claim 52, wherein said flexible pipeline means is a corrugated metal bellows.

54. A construction according to claim 52, wherein said flexible element is a flexible hose.

55. A construction according to claim 54, wherein said flexible hose is constructed of at least one of metal and plastic.

56. A construction according to claim 55, wherein braiding means is provided for reinforcing said hose to permit the same to withstand high internal pressures.

57. A construction according to claim 56, wherein said braiding means includes a band disposed about the circumference of said hose at a braiding angle greater than a neutral braiding angle.

58. A construction according to claim 56, wherein said braiding means includes a plurality of pipe sections disposed about the circumference of the hose at least along a substantial portion of a length of said hose.

59. A construction according to claim 58, wherein each of said pipe sections includes convex rocker surfaces which bear upon each other and extend substantially in a direction of a radius of curvature of the hose.

60. A construction according to claim 52, wherein said flexible pipeline means is a flexible tube.

61. A construction according to claim 60, wherein braiding means is provided for reinforcing said tube to permit the same to withstand high internal pressures.

62. A movable pipeline construction comprising:
a first pipe means for conveying a pressure medium therethrough;
a second pipe means for conveying a pressure medium therethrough;
joint means for sealingly connecting adjacent ends of said pipe means to each other;
at least one port means provided on said first pipe means for directing at least a portion of a flow of a medium from said first pipe means;
at least one pipeline means connected to said at least one port means for receiving the flow of the medium from said port means of said first pipe means; and
at least one port means provided on said second pipe means connected with said at least one pipeline means for diverting the flow from said pipeline means into said second pipe means,
wherein said port means of said first and second pipe means each include openings, at least some of said openings of said first pipe means and said second pipe means facing each other and the remaining openings of said first and second pipe means facing away from each other, the openings of said first and second pipe means facing one another and the openings of said first and second pipe means facing away from each other being arranged on the respective pipe means such that when said first and second pipe means are connected to each other by said joint means, the openings facing one another and facing away from one another are in one of an opposed relation and offset relation with respect to one another, and wherein at least one pipeline means is interposed between each of the openings facing each other and each of the openings facing away from each other with the pipeline means extending between the respective openings along an arcuate path.

63. A construction according to claim 62, wherein an equal number of openings of said first and second pipe means facing one another and facing away from one another are provided.

64. A construction according to claim 63, wherein the arcuate path extends in a direction away from a common longitudinal axis of the pipe means.

65. A construction according to claim 64, wherein the port means of said first and second pipe means merge tangentially into the arcuate path of the pipeline means when the pipeline means is in a normal position.

66. A movable pipeline construction comprising:
a first pipe means for conveying a pressure medium therethrough;
a second pipe means for conveying a pressure medium therethrough;
joint means for sealingly connecting adjacent ends of said pipe means to each other;
at least one port means provided on said first pipe means for directing at least a portion of a flow of a medium from said first pipe means;
at least one pipeline means connected to said at least one port means for receiving the flow of the medium from said port means of said first pipe means; and
at least one port means provided on said second pipe means connected with said at least one pipeline means for diverting the flow from said pipeline means into said second pipe means,
wherein said port means of said first and second pipe means includes a plurality of branch passage means, and wherein there is an even number of branch passage means on each said pipe means, said branch passage means of said pipe means being arranged such that when said first and second pipe means are connected by said joint means, the branch passage means of the second pipe means are offset in the circumferential direction with respect to the branch passage means of said first pipe means, and wherein at least one pipeline means is interposed between each of the branch passage means of said first and second pipe means, each of said pipeline means defining an arcuate path having a predetermined arc length.

67. A construction according to claim 66, wherein each of the branch passage means includes contact and sliding surface portions adapted to be brought into engagement upon a rotational movement between said first and second pipe means.

68. A movable pipeline construction comprising:
a first pipe means for conveying a pressure medium therethrough;
a second pipe means for conveying a pressure medium therethrough;
joint means for sealingly connecting adjacent ends of said pipe means to each other;
at least one port means provided on said first pipe means for directing at least a portion of a flow of a medium from said first pipe means;
at least one pipeline means connected to said at least one port means for receiving the flow of the medium from said port means of said first pipe means; and
at least one port means provided on said second pipe means connected with said at least one pipeline means for diverting the flow from said pipeline means into said second pipe means,
wherein the adjacent ends of said first and second pipe means are in flush alignment and arranged in a plane extending transversely to a common longitudinal axis of said first and second pipe means, and wherein said port means of said first and second pipe means each include a plurality of branch passage means which are in communication with each other by at least one pipeline means extending from one of each of the branch passage means of said first pipe means to one of each of the branch passage means of said second pipe means, and
wherein stop valve means are arranged in each of said pipeline means for controlling the flow of the medium therethrough such that a pipeline means may be shut off without affecting the flow of the medium through the remaining pipeline means and said first and second pipe means.

69. A movable pipeline construction comprising:
a first pipe means for conveying a pressure medium therethrough;
a second pipe means for conveying a pressure medium therethrough;
joint means for sealingly connecting adjacent ends of said pipe means to each other;

at least one port means provided on said first pipe means for directing at least a portion of a flow of a medium from said first pipe means;

at least one pipeline means connected to said at least one port means for receiving the flow of the medium from said port means of said first pipe means; and at least one port means provided on said second pipe means connected with said at least one pipeline means for diverting the flow from said pipeline means into said second pipe means, wherein said port means of said first and second pipe means each include a plurality of branch passage means arranged about the circumference of the respective pipe means with at least portions of the respective branch passage means extending radially outwardly from their associated pipe means, said branch passage means of said first pipe means and said second pipe means being so arranged that when said first pipe means and said second pipe means are connected by said joint means, the branch passage means of the first pipe means and the branch passage means of the second pipe means are disposed in an alternate fashion about the circumference of the pipe means, and wherein at least one pipeline means is arranged between adjacent branch passage means of said first and second pipe means, said pipeline means describing an arcuate path between the associated branch passage means.

70. A construction according to claim 69, wherein said branch passage means of said first and second pipe means each include opening means with each of the opening means of the respective pipe means facing the other pipe means.

71. A movable pipeline construction comprising:
a first pipe means for conveying a pressure medium therethrough;
a second pipe means for conveying a pressure medium therethrough;
joint means for sealingly connecting adjacent ends of said pipe means to each other;
at least one port means provided on said first pipe means for directing at least a portion of a flow of a medium from said first pipe means;
at least one pipeline means connected to said at least one port means for receiving the flow of the medium from said port means of said first pipe means; and
at least one port means provided on said second pipe means connected with said at least one pipeline means for diverting the flow from said pipeline means into said second pipe means,
wherein said port means of said first and second pipe means each include a plurality of branch passage means arranged about the circumference of the respective pipe means, at least one of said branch passage means of each of said first and second pipe means including at least one further branch means arranged thereat which includes at least one pair of openings extending in opposite directions, and wherein a pipeline means is arranged between each of said branch passage means of said first and second pipe means and between each of said openings of said branch means of said first and second pipe means.

72. A construction according to claim 71, wherein stop valve means are arranged in each of said pipeline means for controlling the flow of the medium therethrough such that a pipeline means may be shut off without affecting the flow of the medium through the remaining pipeline means and said first and second pipe means.

73. A construction according to claim 71, wherein at least one further branch means including at least one pair of openings extending in opposite directions is arranged at each branch passage means of said first and second pipe means, and wherein a pipeline means is arranged between each of said openings in said branch means of said first pipe means and each of said openings in said second pipe means.

74. A construction according to claim 73, wherein stop valve means are arranged in each of said pipeline means for controlling the flow of the medium therethrough such that a pipeline means may be shut off without affecting the flow of the medium through the remaining pipeline means and said first and second pipe means.

75. A movable pipeline construction comprising:
a first pipe means for conveying a pressure medium therethrough;
a second pipe means for conveying a pressure medium therethrough;
joint means for sealingly connecting adjacent ends of said pipe means to each other;
at least one port means provided on said first pipe means for directing at least a portion of a flow of a medium from said first pipe means;
at least one pipeline means connected to said at least one port means for receiving the flow of the medium from said port means of said first pipe means; and
at least one port means provided on said second pipe means connected with said at least one pipeline means for diverting the flow from said pipeline means into said second pipe means,
wherein said connecting means including a medium distribution box means provided on adjacent ends of said pipe means, and wherein said port means of said first and second pipe means are provided in said distribution box means, and wherein a pivot bolt means is provided for connecting said distribution box means to each other,
wherein a plurality of port means are provided in said distribution box means, said port means being arranged symmetrically with respect to a common longitudinal axis of said first and second pipe means, and wherein at least one pipeline means is arranged between each port means of the distribution box means of said first pipe means and the port means of the distribution box means of said second pipe means,
wherein each of said pipeline means is a flexible pipe element, and
wherein stop valve means are arranged in each of said pipeline means for controlling the flow of the medium therethrough such that a pipeline means may be shut off without affecting the flow of the medium through the remaining pipeline means and said first and second pipe means.

76. A movable pipeline construction comprising:
a first pipe means for conveying a pressure medium therethrough;
a second pipe means for conveying a pressure medium therethrough;
joint means for sealingly connecting adjacent ends of said pipe means to each other;

at least one port means provided on said first pipe means for directing at least a portion of a flow of a medium from said first pipe means;

at least one pipeline means connected to said at least one port means for receiving the flow of the medium from said port means of said first pipe means; and at least one port means provided on said second pipe means connected with said at least one pipeline means for diverting the flow from said pipeline means into said second pipe means, wherein said port means of said first and second pipe means each include at least two pairs of branch passage means arrange about the circumference of the respective pipe means, one pair of branch passage means of each of said pipe means being provided with opening means facing in a direction toward the other pipe means, the other pair of branch passage means including opening means facing in a direction toward their associated pipe means, and wherein at least one pipeline means is arranged between each of the opening means of said first and second pipe means.

77. A construction according to claim 76, wherein the opening means facing in a direction toward the other pipe means are arranged at diametrically opposite positions about the circumference of the respective pipe means.

78. A construction according to claim 77, wherein the opening means facing in a direction toward their associated pipe means are arranged at diametrically opposite positions about the circumference of the respective pipe means.

79. A construction according to claim 78, wherein each of said pipeline means is a flexible pipe element.

80. A construction according to claim 79, wherein said flexible pipe element is a corrugated bellows.

* * * * *

Disclaimer

4,127,145.—*Udo Erlenmayer,* Eutingen, *Reinhard Gropp,* Arnbach and *Hans Zenn,* Pforzheim, Germany. MOVABLE PIPELINE ELEMENT. Patent dated Nov. 28, 1978. Disclaimer filed June 30, 1986, by the assignee, *Witzenmann GmbH Metallschlauch-Fabrik Pforzheim.*

The term of this patent subsequent to June 13, 1986 has been disclaimed.
[*Official Gazette October 7, 1986.*]